United States Patent
Zeng

(10) Patent No.: US 12,462,510 B2
(45) Date of Patent: Nov. 4, 2025

(54) VIRTUAL SCENE-BASED BEAM DISPLAY METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventor: Tiantong Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

(21) Appl. No.: 18/353,956

(22) Filed: Jul. 18, 2023

(65) Prior Publication Data

US 2023/0360351 A1    Nov. 9, 2023

Related U.S. Application Data

(63) Continuation of application No. PCT/CN2022/132218, filed on Nov. 16, 2022.

(30) Foreign Application Priority Data

Jan. 29, 2022 (CN) .......................... 202210110548.6

(51) Int. Cl.
*G06T 19/20* (2011.01)
*G06T 7/70* (2017.01)
*G06V 10/141* (2022.01)

(52) U.S. Cl.
CPC .............. *G06T 19/20* (2013.01); *G06T 7/70* (2017.01); *G06V 10/141* (2022.01); *G06T 2219/2004* (2013.01); *G06T 2219/2016* (2013.01)

(58) Field of Classification Search
CPC ... G06T 19/20; G06T 7/70; G06T 2219/2004; G06T 2219/2016; G06V 10/141;
(Continued)

(56) References Cited

U.S. PATENT DOCUMENTS

| 2004/0123508 A1 | 7/2004 | Gouko et al. |
| 2017/0309059 A1 | 10/2017 | Howson et al. |

(Continued)

FOREIGN PATENT DOCUMENTS

| CN | 1504718 A | 6/2004 |
| CN | 107704397 A | 2/2018 |

(Continued)

OTHER PUBLICATIONS

Krafton, Inc., "PUBG: Battlegrounds", a video game released on or before Dec. 21, 2017. p. 1-5. https://store.steampowered.com/app/578080/PUBG_BATTLEGROUNDS/ (Year: 2017).*

(Continued)

*Primary Examiner* — Chong Wu
(74) *Attorney, Agent, or Firm* — ANOVA LAW GROUP PLLC

(57) ABSTRACT

A virtual scene-based beam display method includes displaying a virtual scene with a target virtual object and a virtual prop launcher held by the target virtual object displayed in the virtual scene, and in response to a mounting operation for the virtual prop launcher in the virtual scene, displaying a mounted virtual beam emitter based on a target mounting position determined by the mounting operation. The virtual beam emitter is configured to assist the virtual prop launcher in aiming. The method further includes displaying a beam emitted by the virtual beam emitter in the virtual scene based on the target virtual object, the virtual prop launcher, and the target mounting position. The beam points to an aim position of the virtual prop launcher.

16 Claims, 7 Drawing Sheets

(58) Field of Classification Search
CPC ....... G06V 20/20; A63F 13/52; A63F 13/837; A63F 13/573; A63F 2300/8076
See application file for complete search history.

(56) References Cited

U.S. PATENT DOCUMENTS

| | | |
|---|---|---|
| 2023/0055575 A1 | 2/2023 | Qiu et al. |
| 2023/0055890 A1 | 2/2023 | Liu et al. |
| 2023/0360351 A1 | 11/2023 | Zeng et al. |
| 2024/0286035 A1 | 8/2024 | Liu |

FOREIGN PATENT DOCUMENTS

| | | |
|---|---|---|
| CN | 108844406 A | 11/2018 |
| CN | 110585710 A | 12/2019 |
| CN | 110882545 A | 3/2020 |
| CN | 111035924 A | 4/2020 |
| CN | 111111171 A | 5/2020 |
| CN | 111589132 A | 8/2020 |
| CN | 112675544 A | 4/2021 |
| CN | 113262482 A | 8/2021 |
| CN | 114432701 A | 5/2022 |
| JP | 2021520286 A | 8/2021 |
| KR | 20190117908 A | 10/2019 |
| WO | 2021082795 A1 | 5/2021 |

OTHER PUBLICATIONS

WackyJacky101, "GUIDE: Should you use the Laser Sight? Test/analysis—PUBG", a YouTube video posted on Oct. 14, 2018. p. 1. https://www.youtube.com/watch?v=2Z5y1RXGQpE (Year: 2018).*

The Japan Patent Office (JPO) Notice of Reasons for Refusal for Application No. 2023-571836 Oct. 29, 2024 9 Pages (including translation).

[PUBG Mobile] Want to know about attachments? Then this Let's take a look at the video., Youtube, May 21, 2018 (May 21, 2018), https://www.youtube.com/watch?v=gCCdVCSLYF0.

The World Intellectual Property Organization (WIPO) International Search Report for PCT/CN2022/132218 Feb. 10, 2023 7 Pages (including translation).

China National Intellectual Property Administration (CNIPA) Office Action 1 for Application No. 202210110548.6 Mar. 31, 2025 10 Pages (including translation).

* cited by examiner

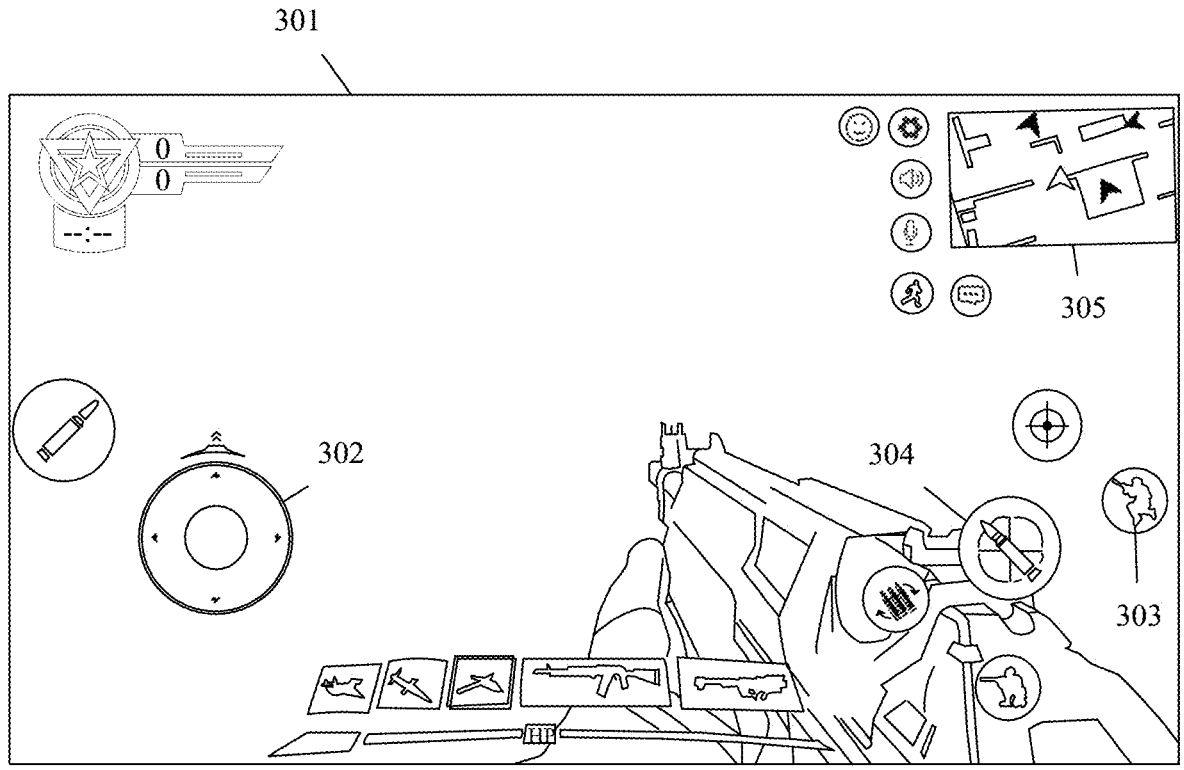

The terminal displays a virtual scene, and a target virtual object and a virtual prop launcher held by the target virtual object are displayed in the virtual scene ⟶ 401

In response to a mounting operation of the virtual prop launcher in the virtual scene, the terminal displays a mounted virtual beam emitter for assisting the virtual prop launcher in aiming based on a target mounting position determined by the mounting operation ⟶ 402

The terminal displays beams emitted by the virtual beam emitter in the virtual scene based on the target virtual object, the virtual prop launcher, and the target mounting position, and the beams point to an aim position of the virtual prop launcher ⟶ 403

FIG. 4

VIRTUAL SCENE-BASED BEAM DISPLAY METHOD, APPARATUS, AND DEVICE, AND STORAGE MEDIUM

CROSS-REFERENCE TO RELATED APPLICATIONS

This application is a continuation of International Application No. PCT/CN2022/132218, filed on Nov. 16, 2022, which claims priority to Chinese Patent Application No. 202210110548.6, entitled "VIRTUAL SCENE-BASED BEAM DISPLAY METHOD, APPARATUS, AND DEVICE, AND STORAGE MEDIUM" filed with the China National Intellectual Property Administration on Jan. 29, 2022, which are incorporated herein by reference in their entirety.

FIELD OF THE TECHNOLOGY

This application relates to the field of computer technologies and, in particular, to a virtual scene-based beam display method, apparatus, and device, and a storage medium.

BACKGROUND OF THE DISCLOSURE

With the development of multimedia technologies and diversification of terminal functions, there are more and more kinds of games that can be played on a terminal. Shooting game is a kind of popular game. In a shooting games, a user can control a virtual object to use different virtual prop launchers, and can fight against the virtual object controlled by another user using the virtual prop launcher.

In related technologies, a crosshair is usually displayed on a game picture to prompt the user of an aim position of the virtual prop launcher. However, the crosshair is often small in area and light in color. In a case of a game scene with complicated display content, it is difficult to find the position of the crosshair, and the aiming difficulty is relatively high, which may greatly influence a hit rate of the virtual object controlled by a player, resulting in poor game experience, and low efficiency of human-computer interaction. Further, due to the small area and light color of the crosshair, the player often needs to repeatedly debug the virtual prop launcher to effectively aim at the target, resulting in excessively long battle time and game time of the player, thereby wasting power resources of the terminal, and influencing the endurance of the terminal.

SUMMARY

In accordance with the disclosure, there is provided a virtual scene-based beam display method including displaying a virtual scene with a target virtual object and a virtual prop launcher held by the target virtual object displayed in the virtual scene, and in response to a mounting operation for the virtual prop launcher in the virtual scene, displaying a mounted virtual beam emitter based on a target mounting position determined by the mounting operation. The virtual beam emitter is configured to assist the virtual prop launcher in aiming. The method further includes displaying a beam emitted by the virtual beam emitter in the virtual scene based on the target virtual object, the virtual prop launcher, and the target mounting position. The beam points to an aim position of the virtual prop launcher.

Also in accordance with the disclosure, there is provided a computer device including one or more processors and one or more memories storing at least one computer-readable instruction that, when executed by the one or more processors, causes the one or more processors to display a virtual scene with a target virtual object and a virtual prop launcher held by the target virtual object displayed in the virtual scene, and in response to a mounting operation for the virtual prop launcher in the virtual scene, display a mounted virtual beam emitter based on a target mounting position determined by the mounting operation. The virtual beam emitter is configured to assist the virtual prop launcher in aiming. The at least one computer-readable instruction further causes the one or more processors to display a beam emitted by the virtual beam emitter in the virtual scene based on the target virtual object, the virtual prop launcher, and the target mounting position. The beam points to an aim position of the virtual prop launcher.

Also in accordance with the disclosure, there is provided a non-transitory computer-readable storage medium storing at least one computer-readable instruction that, when executed by one or more processors, causes the one or more processors to display a virtual scene with a target virtual object and a virtual prop launcher held by the target virtual object displayed in the virtual scene, and in response to a mounting operation for the virtual prop launcher in the virtual scene, display a mounted virtual beam emitter based on a target mounting position determined by the mounting operation. The virtual beam emitter is configured to assist the virtual prop launcher in aiming. The at least one computer-readable instruction further causes the one or more processors to display a beam emitted by the virtual beam emitter in the virtual scene based on the target virtual object, the virtual prop launcher, and the target mounting position. The beam points to an aim position of the virtual prop launcher.

BRIEF DESCRIPTION OF THE DRAWINGS

To describe the technical schemes in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 3 is a schematic diagram showing a virtual scene according to an embodiment of this application.

FIG. 4 is a flowchart of a virtual scene-based beam display method according to an embodiment of this application.

DESCRIPTION OF EMBODIMENTS

Figure 1:
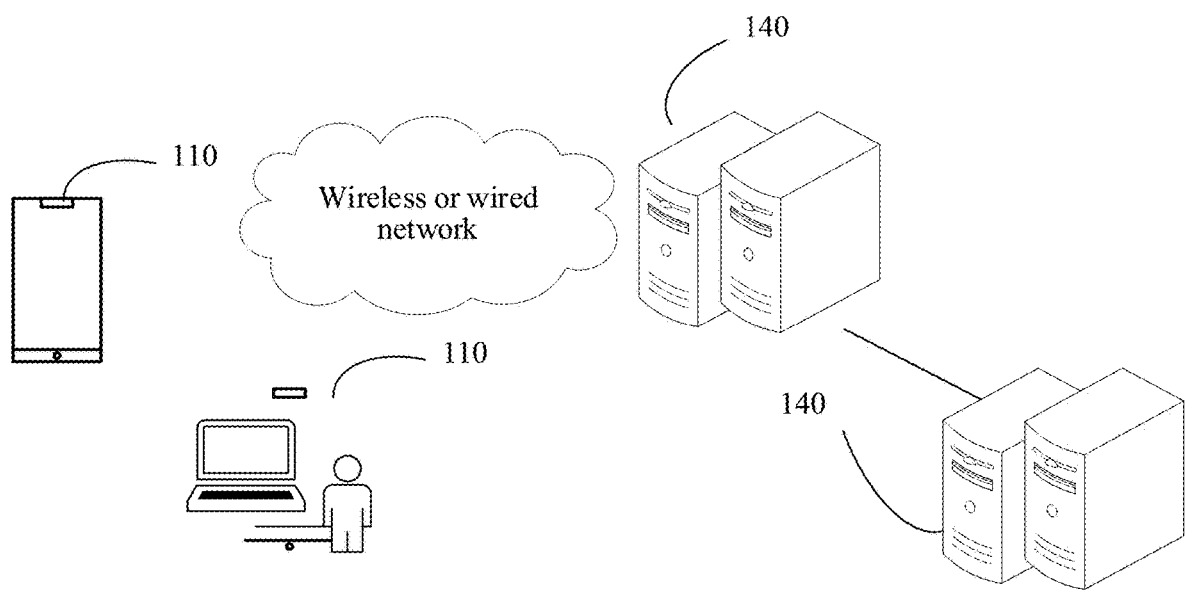
FIG. 1 is a schematic diagram showing an implementation environment of a virtual scene-based beam display method according to an embodiment of this application.

To make the objectives, technical schemes, and advantages of this application clearer, the following further describes implementations of this application in detail with reference to the accompanying drawings.

Terms such as "first", "second", and the like in this application are used for distinguishing same or similar items with basically the same function. It may be understood that "first", "second", and "$n^{th}$" do not have logical or chronological dependency, and do not limit the number and execution order.

The term "at least one" in this application refers to one or more, and "a plurality of" refers to two or more.

In related technologies, a crosshair may always be displayed on a game picture. The crosshair is used for prompting the aim position of a virtual prop launcher. The game picture is used for simulating a real scene. However, there is no crosshair in the real scene, and the display of the crosshair in the game picture may reduce the reality of the game. In a case of not displaying the crosshair in the game picture, an aiming apparatus on a fixed position may be used for aiming, which can improve the reality of the game, but may reduce the aiming accuracy. In addition, due to the fixed position of the aiming apparatus, the configuration of the aiming apparatus is not flexible enough.

Virtual scene: the virtual scene is displayed (provided) during the running of an application program on a terminal. The virtual scene may be a simulation environment for the real world, a semi-simulation and semi-fiction virtual environment, or a purely fictional virtual environment. The virtual scene may be any of a two-dimensional virtual scene, a 2.5-dimensional virtual scene, or a three-dimensional virtual scene. The dimension of the virtual scene is not limited by the embodiments of this application. For example, the virtual scene may include sky, land, ocean, and the like. The land may include desert, city, and other environmental elements, and users may control virtual objects to move in the virtual scene.

Virtual object: the virtual object refers to a movable object in the virtual scene. The movable object may be a virtual figure, a virtual animal, a cartoon figure, and the like, such as: figures, animals, plants, oil drums, walls, stone, and the like displayed in the virtual scene. The virtual object may be a virtual image for representing the user in the virtual scene. The virtual scene may include a plurality of virtual objects, and each virtual object has a shape and a size in the virtual scene, and occupies a part of space in the virtual scene.

Optionally, the virtual object is a user character controlled by an operation on a client, or an artificial intelligence (AI) set in a battle of the virtual scene by training, or a non-player character (NPC) set in the virtual scene. Optionally, the virtual object is a virtual figure carrying out competition in the virtual scene. Optionally, the number of virtual objects participating in the interaction in the virtual scene is preset, or determined dynamically according to the number of clients participating in the interaction.

Taking a shooting game as an example, the user may control the virtual object to fall freely, glide, or fall by opening a parachute in the sky of the virtual scene, or run, jump, creep, bend forward on the land, or may control the virtual object to swim, float, or dive in the ocean. Certainly, the user may also control the virtual object to ride in a virtual carrier to move in the virtual scene, for example, the virtual carrier may be a virtual vehicle, a virtual aircraft, a virtual yacht, and the like. The foregoing scenes are used as an example only herein, which is not specifically limited in the embodiments of this application. The user may also control the virtual object to interact with another virtual object in a fighting way using an interaction prop. For example, the interaction prop may be a grenade, a cluster bomb, a sticky grenade, and other throwing interaction props, or may be a shooting interaction prop such as a machine gun, a pistol, a rifle, and the like. The specific type of the interaction prop is not limited in this application. It is to be noted that, the shooting interaction props such as the machine gun, the pistol, and the rifle mentioned above are all props in the game.

FIG. 1 is a schematic diagram showing an implementation environment of a virtual scene-based beam display method according to an embodiment of this application. Referring to FIG. 1, the implementation environment includes: a terminal 110 and a server 140.

The terminal 110 is equipped with and runs an application program supporting the virtual scene display. Optionally, the application program is any of a first-person shooting game (FPS), a third-person shooting game, a virtual-reality application program, a three-dimensional map program, or a multi-person instrument survival game. The terminal 110 is a terminal used by a user. The user uses the terminal 110 to operate a target virtual object in the virtual scene to carry out activities. The activities include, but are not limited to: any of adjustment of body posture, creeping, walking, running, riding, jumping, driving, picking, shooting, attacking, and throwing. Schematically, the target virtual object is a virtual figure, such as a simulation figure character or a cartoon figure character.

The server 140 may be an independent physical server, a server cluster or distributive system composed of a plurality of physical servers, or a cloud server providing cloud services, cloud databases, cloud computation, cloud functions, cloud storage, network services, cloud communication, middle-ware services, domain name services, security services, content delivery network (CDN), and basic cloud computing services such as big data, artificial intelligent platforms, and the like. The number and device type of the server are not limited in the embodiments of this application. The server 140 provides background services for application programs run on the terminal 110. The terminal 110 is connected with the server 140 through a wireless network or a wired network.

After the implementation environment of the embodiments of this application is described, an application scene of the embodiments of this application is described below. In the following description process, the terminal is also the terminal 110 in the above implementation environment, and the server is also the above server 140.

Technical schemes provided in the embodiments of this application can be applied to the scene of the shooting games. In the shooting games, the terminal displays the virtual scene. The virtual scene includes a target virtual object, and the user can control the target virtual object to move and attack in the virtual scene by the terminal. In some embodiments, the target virtual object holds a virtual prop launcher, and can attack other virtual objects in the virtual scene using the virtual prop launcher. In a game process, the user can control the virtual prop launcher held by the target virtual object to aim at the to-be-attacked virtual object so as to attack the virtual object. In some embodiments, the terminal may display a crosshair of the virtual prop launcher in the virtual scene. The crosshair is used for indicating an aim position of the virtual prop launcher in the virtual scene. The user can also realize a purpose of controlling the virtual prop launcher to aim by adjusting the position of the crosshair. In some cases, since the virtual scene may be complicated, and the displayed content is relatively complicated, the user may not accurately check the position of the crosshair, which leads to relatively high aiming difficulty of the virtual prop launcher, and low efficiency of the human-computer interaction. Moreover, due to small area and light color of the crosshair, the user often needs to repeatedly debug the virtual prop launcher to effectively aim at the target, resulting in excessively long battle time and game time of the user, thereby wasting the power resources of the terminal, and influencing the endurance of the terminal.

By adopting the technical schemes provided in the embodiments of this application, the user can add a virtual beam emitter for the virtual prop launcher; the aiming of the virtual prop launcher is assisted by the virtual beam emitter, so that the aiming difficulty of the virtual prop launcher is reduced, the efficiency of human-computer interaction is improved, and the user can effectively aim at the target without repeated debugging, thereby shortening the battle time and the game time, saving the power resource of the terminal, and improving the endurance of the terminal. In addition, the user can voluntarily select a mounting position of the virtual beam emitter on the virtual prop launcher. No matter on which position the virtual beam emitter is mounted on the virtual prop launcher, the virtual beam emitter can emit a beam to the aim position of the virtual prop launcher, which improves the reality of the game, enriches the game choices of the user, and improves the efficiency of human-computer interaction.

It is to be noted that, the foregoing description is made by taking the application of the technical scheme according to the embodiments of this application in the scene of shooting games as an example. In other possible implementations, the technical schemes provided in the embodiments of this application can also be applied to other games needing the aiming, which is not limited in the embodiments of this application.

It is to be noted that, the foregoing description is made by taking the terminal performing the virtual scene-based beam display method according to an embodiment of this application as an example. In a case that the shooting game is a cloud game, the virtual scene-based beam display method according to the embodiment of this application can also be performed by the server, that is, the server performs background processing to generate video stream, and pushes the video stream to the terminal, and the terminal displays the video stream. The embodiments of this application do not limit this.

Figure 2:
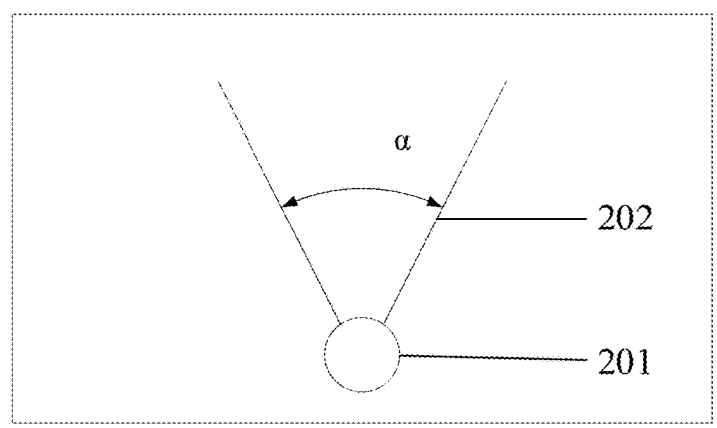
FIG. 2 is a schematic diagram showing a viewing angle observing a virtual scene according to an embodiment of this application.

To describe the technical scheme provided in the embodiments of this application more clearly, the virtual scene in this application is introduced below. Referring to FIG. 2, in order to make the shooting game more real, game designers may design the virtual scene display method by referring to a way that the human beings observe the real world. A first virtual object 201 can observe a virtual scene in an area 202, and a picture obtained by observing the area 202 from an angle of the first virtual object 201 is the to-be-displayed virtual scene. The user can adjust the position where the first virtual object 201 observes the virtual scene by adjusting an orientation of the first virtual object 201.

In some embodiments, the virtual scene includes a control for controlling the target virtual object to perform different actions. Referring to FIG. 3, a virtual joystick 302, a posture adjustment control 303, and a shooting control 304 are displayed in the virtual scene 301. The virtual joystick 302 is configured to control a movement direction of the target virtual object. The posture adjustment control 303 is configured to adjust a posture of the target virtual object, for example, controlling the virtual object to perform the actions such as squatting, crawling, or the like. The shooting control 304 is configured to control the virtual prop launcher held by the target virtual object to launch a virtual prop. In some embodiments, the virtual prop launcher is a virtual instrument in the game, and the virtual prop is virtual ammunition in the game. 305 indicates a small map, or a virtual map. The user can observe the position of an ally or an enemy in the virtual scene using the small map 305.

After the implementation environment and application scene of the embodiments of this application are described, the virtual scene-based beam display method according to an embodiment of this application is described below. The method may be performed independently by the terminal 110, or performed collaboratively by the terminal 110 and the server 140. Referring to FIG. 4, the method that is performed by the terminal 110 shown in FIG. 1 is taken as an example for description. The method includes:

401: A terminal displays a virtual scene, and a target virtual object and a virtual prop launcher held by the target virtual object are displayed in the virtual scene.

The virtual scene is an activity scene of the virtual object, and the virtual scene is to simulate the real world. In some embodiments, the virtual scene is also referred to as a game scene. The target virtual object is a virtual object controlled by the terminal, and the user can control the target virtual object to perform interaction in the virtual scene using the terminal. The virtual prop launcher is a kind of game prop provided for the game. The virtual prop launcher can launch a virtual prop in the virtual scene to attack the virtual object. The virtual prop launcher is also a virtual instrument in the game. The virtual prop launched by the virtual prop launcher is virtual ammunition in the game.

402: The terminal displays the mounted virtual beam emitter based on a target mounting position determined by a mounting operation in response to the mounting operation for the virtual prop launcher in the virtual scene, and the virtual beam emitter is configured to assist the virtual prop launcher in aiming.

The mounting operation for the virtual prop launcher refers to an operation of selecting the mounting position for the virtual beam emitter on the virtual prop launcher. The virtual beam emitter can emit beams in the virtual scene. The beams can play a role in assisting the virtual prop launcher in aiming, for example, the virtual beam emitter may be a virtual laser indicator. In the embodiments of this application, the mounting position of the virtual beam emitter on the virtual prop launcher is determined by the user, that is, in the embodiments of this application, multiple assembly forms between the virtual beam emitter and the virtual prop launcher are provided, thereby providing abundant assembly ways for the user.

403: The terminal displays the beam emitted by the virtual beam emitter in the virtual scene based on the target virtual object, the virtual prop launcher, and the target mounting position, and the beam points to the aim position of the virtual prop launcher.

The beam emitted by the virtual beam emitter points to the aim position of the virtual prop launcher, that means that the user can know the aim position of the virtual prop launcher by checking the pointing direction of the beam, so that the user controls the virtual prop launcher to aim, and the efficiency of the human-computer interaction is relatively high. The user can aim at the target effectively without adjusting the posture and position of the target virtual object for repeated debugging, so that the battle time and game time are shortened, and the endurance of the terminal is improved.

According to the technical scheme provided in the embodiments of this application, a function of mounting the virtual beam emitter in the virtual scene is provided, and the mounting position can be selected voluntarily during the mounting. During the aiming, the beam is displayed according to the target virtual object, the virtual prop launcher, and the mounting position of the virtual beam emitter, so that the beam can point to the aim position of the virtual prop launcher, the aiming of the user can be assisted by the beam, thereby reducing the aiming difficulty, and improving the efficiency of the human-computer interaction.

Figure 5:
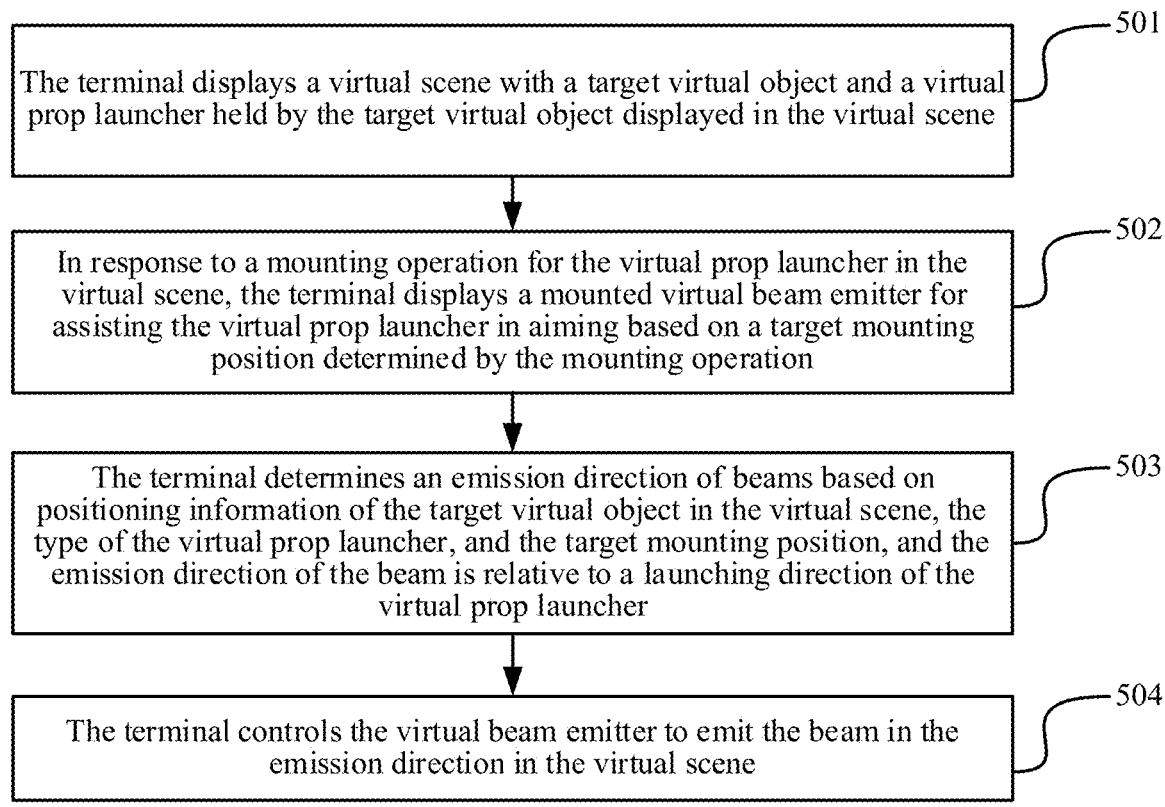
FIG. 5 is a flowchart of a virtual scene-based beam display method according to an embodiment of this application.

The above step 401 to step 403 briefly introduce the virtual scene-based beam display method according to an embodiment of this application. In combination with some examples, the technical scheme provided by the embodiments of this application is described below in detail. The method may be performed independently by the terminal 110, or performed collaboratively by the terminal 110 and the server 104. The method that is performed by the terminal 110 is taken as an example for description. Referring to FIG. 5, the method includes:

501: The terminal displays the virtual scene, and the target virtual object and the virtual prop launcher held by the target virtual object are displayed in the virtual scene.

In some embodiments, the virtual scene is a game scene of shooting games. The target virtual object is a virtual object controlled by the terminal, and the user can control the target virtual object to move, use props, drive a virtual carrier, and perform other activities in the virtual scene using the terminal. The virtual prop launcher is a game prop provided in the shooting games. The virtual prop launcher can launch the virtual props in the virtual scene. The virtual props launched by the virtual prop launcher can attack the virtual object in the virtual scene. In a case that the virtual object in the virtual scene is hit by the virtual prop, an attribute value of the virtual object may decrease. A decrease amount of the attribute value of the virtual prop is related to at least one of a type of the virtual prop, a position hit by the virtual prop, and an equipped virtual armor. In a case that the attribute value of the virtual object decreases to a target value, the virtual object is defeated. In some embodiments, the attribute value is also referred to as a life value of the virtual object. The target value is 0, that is, in a case that the life value of the virtual object decreases to 0, the virtual object is defeated.

In a possible implementation, in response to a competition battle started by the user, the terminal displays the virtual scene corresponding to the competition battle, and displays the target virtual object in the virtual scene. The competition battle is a shooting game, and the virtual scene displayed by the terminal is one part of the virtual scene. The target virtual object is displayed at the center of the virtual scene displayed in the terminal. The virtual scene displayed in the terminal may move with the target virtual object. The target virtual object holds the virtual prop launcher. In some embodiments, the target virtual object can adopt at least two postures to hold the virtual prop launcher. A first posture is to arrange the virtual prop launcher at the waist of the target virtual object, and the posture is also referred to as "hip fire"; and a second posture is to arrange the virtual prop launcher on a shoulder of the target virtual object, and the posture is also referred to as "aiming down sight (ADS)", i.e., a posture using an aiming tool of the virtual prop launcher to aim. A transition from the "hip fire" to the "ADS" is also referred to as start shooting. In some embodiments, the virtual scene displayed in the terminal is also referred to as a viewing range of the target virtual object. In this case, in a case that another virtual object enters the viewing range of the target virtual object, the terminal can display the other virtual object.

The above implementation is described below with two examples.

Example 1: in response to a click operation on a target icon, the terminal starts a target application program, the target icon is an icon corresponding to the target application program, and the target application program is an application program of the competition battle. The terminal loads relevant resources of the target application program, and displays a main interface of the target application program. In response to an operation on the main interface, that is, starting a competition battle, the terminal loads a rendering resource of the virtual scene, and displays the virtual scene corresponding to the competition battle, and the target virtual object and the virtual prop launcher held by the target virtual object are displayed in the virtual scene. In some embodiments, the user voluntarily switches the virtual prop launcher held by the target virtual object in the game process, and can also voluntarily switch the posture in which the target virtual object holds the virtual prop launcher. In this case, both the rendering and display of the virtual scene are performed by the terminal.

Example 2: in response to a click operation on the target icon, the terminal transmits an application program starting request to the terminal, the target icon is an icon corresponding to the target application program, the target application program is an application program of the competition battle, and the application program starting request carries an identifier of the target application program. In response to receiving the application program starting request, the server acquires the identifier of the target application program from the application program starting request, and starts the target application program based on the identifier of the target application program. The server continuously pushes video stream of the target application program to the terminal, and the terminal displays the video stream. In response to an operation based on the video stream, the terminal transmits a competition battle starting request to the server. The server receives the competition battle starting request, loads the rendering resource of the virtual scene based on the competition battle starting request, and generates the virtual scene corresponding to the competition battle. The server pushes the video stream corresponding to the competition battle to the terminal, the terminal displays the virtual scene corresponding to the competition battle, and the target virtual object and the virtual prop launcher held by the target virtual object are displayed in the virtual scene. In this case, the rendering of the virtual scene is performed by the server, the display of the virtual scene is performed by the terminal, and the shooting game is the cloud game.

502: The terminal displays the mounted virtual beam emitter based on the target mounting position determined by the mounting operation in response to the mounting operation for the virtual prop launcher in the virtual scene, and the virtual beam emitter is configured to assist the virtual prop launcher in aiming.

The virtual beam emitter is a game prop provided for the shooting games. In the shooting games, the virtual beam emitter is also referred to as a laser indicator or abbreviated as "LI". In some embodiments, the virtual beam emitter includes multiple types. Different types of virtual beam emitters have different performance parameters. For example, different types of virtual beam emitters have different shapes, or different types of virtual beam emitters can emit different colors of beams, etc. The virtual beam emitter can be mounted on the virtual prop launcher to assist the virtual prop by emitting the beams, that is, after the virtual beam emitter is mounted on the virtual prop launcher, the virtual beam emitter can emit the beam pointing to the aim position of the virtual prop launcher in the virtual scene, and the user can determine the current aim position of the virtual prop launcher by checking the beam, thereby facilitating the user to aim. In some embodiments, the beam emitted by the virtual beam emitter is realized by a special effect of particles. The target mounting position is determined based on a mounting operation, that is, the user can voluntarily select the mounting position of the virtual beam emitter on the virtual prop launcher, so as to realize the personalized assembly of the virtual prop launcher, and provide the user with richer playing methods. In addition, in some embodiments, various accessories are provided for the virtual prop launcher in the shooting games. Different types of accessories can provide different functions for the virtual prop launcher. The virtual beam emitter is an accessory of the virtual prop launcher. The mounting positions of a plurality of accessories of the virtual prop launcher are determined freely by the user. The mounting position of each accessory may be adjusted, that is, the user can adjust the mounting position of the virtual beam emitter on the virtual prop launcher at any time in the game process.

Figure 6:
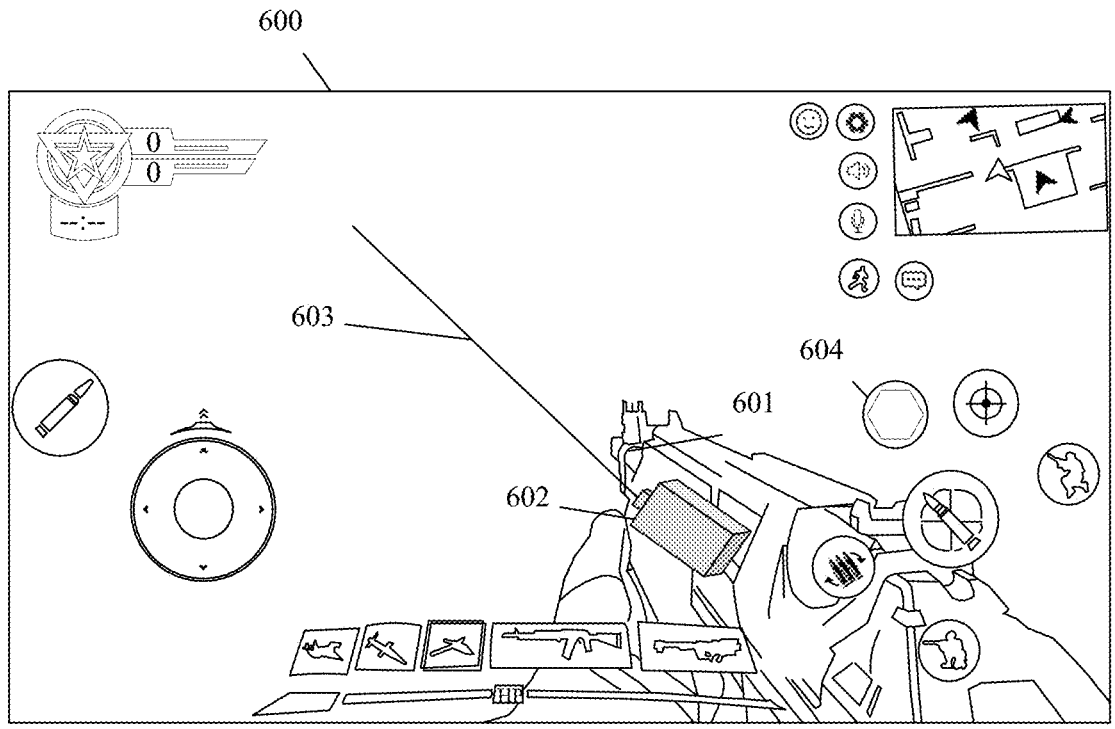
FIG. 6 is a schematic diagram showing another virtual scene according to an embodiment of this application.

For example, referring to FIG. 6, the terminal displays a virtual scene 600. A virtual prop launcher 601 is displayed in the virtual scene 600. The virtual prop launcher 601 is mounted with a virtual beam emitter 602. The virtual beam emitter 602 emits a beam 603 in the virtual scene.

In a possible implementation, in response to a first operation in the virtual scene, the terminal displays a mounting page of the virtual prop launcher in the virtual scene. A plurality of candidate mounting positions of the virtual prop launcher are displayed in the mounting page. In response to a second operation in the mounting page, the terminal determines the selected candidate mounting position in the plurality of candidate mounting positions as the target mounting position. The terminal displays the virtual beam emitter at the target mounting position of the virtual prop launcher.

The mounting page of the virtual prop launcher is configured to mount the accessory for the virtual prop launcher. A plurality of candidate mounting positions provided on the mounting page are positions provided for the virtual prop launcher to mount the accessories. The mounting page provides the user with a function of selecting the mounting position. In some embodiments, the mounting page also includes an accessory selection area. The accessory selection area includes a plurality of accessories possessed by the target virtual object. The user can select the accessory to be mounted on the virtual prop launcher from the accessory selection area. The accessory selection area is also referred to as a virtual backpack of the target virtual object.

In the implementation, in an aspect, a way of aiming with the virtual beam emitter is provided, which can improve the reality of the game compared with the way of aiming with the crosshair in related technologies. Moreover, the emitted virtual beam may help the user to aim at the target using the virtual prop launcher, and the user may effectively aim at the target without repeated debugging, so that the battle time and the game time of the user are shortened, and the endurance of the terminal is improved. In another aspect, a plurality of candidate mounting positions are provided for the virtual beam emitter on the virtual prop launcher. The user can voluntarily select the target mounting position from the plurality of candidate mounting positions, so that the flexibility in mounting the virtual beam emitter is improved.

Voluntarily selecting the target mounting position from a plurality of candidate mounting positions can at least bring about the following effects:

First, it adapts to the use habits of the users, for example, some users are used to mounting the virtual beam emitter at the right side of the virtual prop launcher, and some users are used to mounting the virtual beam emitter at the left side of the virtual prop launcher, so that providing a plurality of candidate mounting positions may also adapt to different use habits of the users.

Second, since different virtual prop launchers may be different in size and shape, and different virtual beam emitters may also be different in size and shape, in a case that the virtual beam emitter is mounted on a position on the virtual prop launcher, the visual field may be blocked. In a case of providing a plurality of candidate mounting positions, the user can adjust the mounting position of the virtual beam emitter in time in response to that the visual field is blocked, so that the situation that the visual field is blocked can be solved.

In order to describe the above implementation more clearly, the above implementation is described in three parts below.

Part I: in response to the first operation in the virtual scene, the terminal displays the mounting page of the virtual prop launcher in the virtual scene.

Figure 7:
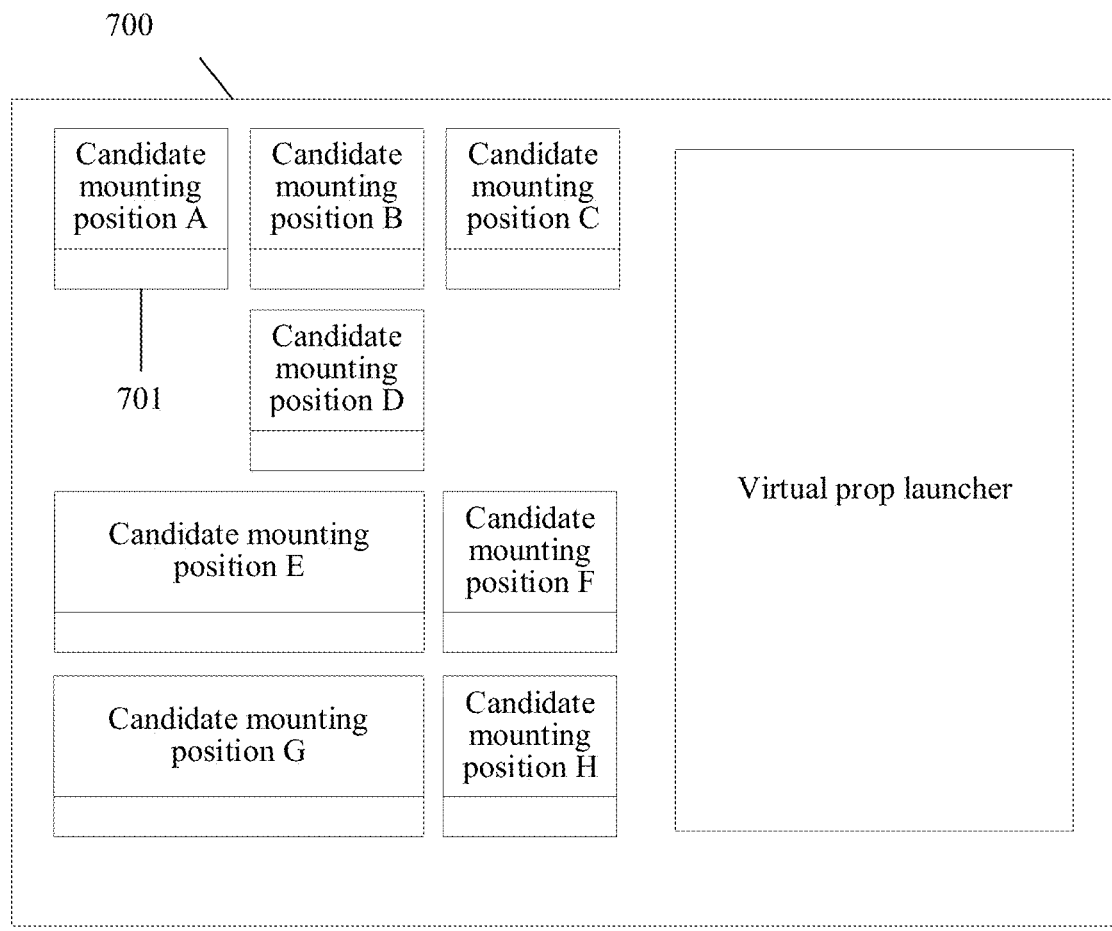
FIG. 7 is a schematic diagram showing another virtual scene according to an embodiment of this application.

FIG. 7 is a schematic diagram showing the mounting page of the virtual prop launcher. Referring to FIG. 7, the mounting page 700 includes a plurality of candidate mounting positions. The plurality of candidate mounting positions correspond to different parts of the virtual prop launcher. In some embodiments, the virtual prop launcher is also displayed in the mounting page, so that the user knows which virtual prop launcher is mounted with the virtual beam emitter at present.

In a possible implementation, in response to a picking operation on the virtual beam emitter in the virtual scene, the terminal displays the mounting page of the virtual prop launcher in the virtual scene. In this case, the first operation in the virtual scene is the picking operation on the virtual beam emitter in the virtual scene.

The picking operation in the virtual scene refers to an operation of controlling the target virtual object to pick the virtual beam emitter in the virtual scene. In some embodiments, the virtual beam emitter in the virtual scene is the virtual beam emitter dropping randomly in the virtual scene, or dropping after the virtual object in the virtual scene is defeated, which is not limited in the embodiments of this application.

In this implementation, in a case that the target virtual object picks the virtual beam emitter in the virtual scene, the terminal can display the mounting page of the virtual prop launcher, and provides the user with the to-be-selected mounting position for mounting the picked virtual beam emitter by using the mounting page, so that the efficiency is relatively high.

For example, in response to that the target virtual object approaches the position of the virtual beam emitter in the virtual scene, the terminal displays the pick control on the virtual beam emitter. The position of the target virtual object in the virtual scene is controlled by the user, that is, the user, when seeing the virtual beam emitter, can control the target virtual object to move towards the position of the virtual beam emitter, so as to control the target virtual object to pick the virtual beam emitter. In response to a click operation on the pick control, the target virtual object picks the virtual beam emitter, and displays the mounting page of the virtual prop launcher. The target virtual object picks the virtual beam emitter, which refers to storing the virtual beam emitter in the virtual backpack of the target virtual object. Or, in response to that the target virtual object approaches the position of the virtual beam emitter in the virtual scene, the terminal controls the target virtual object to pick the virtual beam emitter, that is, in a case that the user controls the target virtual object to approach the virtual beam emitter, the terminal can automatically control the target virtual object to pick the virtual beam emitter without the manual control, so that the efficiency of the human-computer interaction is relatively high. In response to that the target virtual object picks the virtual beam emitter, the terminal displays the mounting page of the virtual prop launcher, and the user can select the mounting position for the picked virtual beam emitter by using the mounting page.

In a possible implementation, in response to a click operation on the mounting control displayed in the virtual scene, the terminal displays the mounting page of the virtual prop launcher in the virtual scene.

The mounting control is a function control triggering the display of the mounting page. The form and display position of the mounting control are set by the technical personnel according to the actual situation, which are not limited in the embodiments of this application. In this case, the first operation in the virtual scene is a click operation on the mounting control in the virtual scene.

In this implementation, in a case that the user wants to check the mounting page of the virtual prop launcher, the user may click the mounting control directly, so that the efficiency of the human-computer interaction is relatively high.

For example, referring to FIG. 6 and FIG. 7, a mounting control 604 is displayed in the virtual scene 600. In response to the click operation on the mounting control 604, the terminal displays a mounting page 700 of the virtual prop launcher in the virtual scene.

Part II: in response to the second operation in the mounting page, the terminal determines the selected candidate mounting position in the plurality of candidate mounting positions as the target mounting position.

The target mounting position is the mounting position of the virtual beam emitter on the virtual prop launcher.

In a possible implementation, in response to the click operation on any candidate mounting position in the plurality of candidate mounting positions in the mounting page, the terminal determines the candidate mounting position as the target mounting position.

In this case, the second operation in the virtual scene is the click operation on any candidate mounting position in the plurality of candidate mounting positions.

In this implementation, the user can rapidly select the target mounting position in a click way, so that the efficiency of the human-computer interaction is relatively high.

For example, referring to FIG. 7, in response to the click operation on any candidate mounting position 701 in the plurality of candidate mounting positions in the mounting page 700, the terminal determines the candidate mounting position 701 as the target mounting position.

In a possible implementation, in response to that the virtual beam emitter in the mounting page is dragged to any candidate mounting position in the plurality of candidate mounting positions, the terminal determines the candidate mounting position as the target mounting position.

In this implementation, the user can select the mounting position for the virtual beam emitter in a drag way. At the same time, the drag operation can also indicate the virtual beam emitter that selects the mounting position at present, so that the probability of wrong selection is reduced.

For example, referring to FIG. 7, in response to that the virtual beam emitter is dragged to any candidate mounting position 701 in the plurality of candidate mounting positions, the terminal determines the candidate mounting position 701 as the target mounting position.

Part III: the terminal displays the virtual beam emitter at the target mounting position of the virtual prop launcher.

In a possible implementation, the terminal renders a model of the virtual beam emitter to the target mounting position based on the target mounting position and the model of the virtual prop launcher.

It is to be noted that, step 502 is described by taking the terminal performing corresponding steps based on the operation as an example. In a cloud game scene, the terminal can also transmit a corresponding instruction to the server based on the operation, and the steps corresponding to the instruction are performed by the server. The rendered video stream is transmitted to the terminal, and the terminal displays the video stream.

503: The terminal determines an emission direction of the beam based on positioning information of the target virtual object in the virtual scene, the type of the virtual prop launcher, and the target mounting position, and the emission direction of the beam is relative to the launching direction of the virtual prop launcher.

In a possible implementation, the terminal determines a target position of the virtual beam emitter based on first positioning information of the target virtual object in the virtual scene and the target mounting position, and the first positioning information includes a position and a pointing direction of a hand of the target virtual object in the virtual scene. The terminal determines the emission direction of the beam based on the first positioning information, second positioning information of the target virtual object, the type of the virtual prop launcher, the position of the hand, and the target position, and the second positioning information includes a position and an orientation of a virtual camera of the target virtual object in the virtual scene.

Since the virtual beam emitter includes a plurality of candidate mounting positions, in a case that the virtual beam emitter is mounted on different candidate positions, the beam emission direction of the virtual beam emitter may be different, and the terminal can determine the emission direction of the beam according to a plurality of information, so as to ensure that the beam can point to the aim position of the virtual prop launcher. The virtual camera is an "eye" for the user to observe the virtual scene, and the virtual scene displayed in the terminal is a picture photographed by the virtual camera. In the first-person shooting game, the position of the virtual camera in the virtual scene is the position of a head of the target virtual object in the virtual scene, so as to simulate an angle at which the target virtual object observes the virtual scene. Or, the position of the virtual camera in the virtual scene is the position of the eyes of the target virtual object in the virtual scene. In the third-person shooting game, the position of the virtual camera in the virtual scene is above the target virtual object.

In order to describe the above implementation more clearly, the above implementation is described in two parts below.

Part I: the terminal determines a target position of the virtual beam emitter based on the first positioning information of the target virtual object in the virtual scene and the target mounting position.

The first positioning information includes the position and the pointing direction of the hand of the target virtual object in the virtual scene. The position of the hand in the virtual scene is a relative position between the hand and an origin of the model of the target virtual object. Correspondingly, the pointing direction of the hand in the virtual scene is a relative pointing direction between the hand and the origin of the model of the target virtual object. The target mounting position is a relative position between the virtual beam emitter and the virtual prop launcher. The target position is a relative position between the virtual beam emitter and the origin of the model of the target virtual object. In some embodiments, the origin of the model of the target virtual object is also referred to as a root bone, and a coordinate system established with the root bone is also referred to as a figure space. In some embodiments, the terminal adopts a coordinate form to indicate the position of the hand in the virtual scene, and adopts a vector form to indicate the pointing direction of the hand in the virtual scene. In some embodiments, the coordinate system established with the origin of the virtual prop launcher is also referred to as an instrument space. Through the processing of part I, the target position between the virtual beam and the root bone can be determined, and the coordinate system can be transformed, which facilitates the subsequent processing.

In a possible implementation, the terminal generates a first rotation matrix based on the pointing direction of the hand. The terminal adopts the first rotation matrix to process the target mounting position to obtain a reference position of the virtual beam emitter. The terminal fuses the position of the hand and the reference position of the virtual beam emitter to obtain a target position of the virtual beam emitter. The target position is a relative position between the virtual beam emitter and the target virtual object.

The relative position between the virtual beam emitter and the target virtual object is the relative position between the virtual beam emitter and the origin of the model of the target virtual object. In a case that the target virtual object holds the virtual prop launcher, the orientation of the hand of the target virtual object is the orientation of the virtual prop launcher in the virtual scene.

For example, the terminal acquires a holding picture of the target virtual object for the virtual prop launcher. The terminal acquires the first positioning information of the target virtual object in the virtual scene based on the holding picture, i.e., a coordinate and a direction vector of the hand of the target virtual object. The terminal generates the first rotation matrix based on the direction vector of the hand. The terminal adopts the first rotation matrix to process a target mounting coordinate to obtain a reference coordinate of the virtual beam emitter. The target mounting coordinate indicates the target mounting position, and the reference coordinate indicates the reference position. The terminal adds the coordinate of the hand with the reference coordinate of the virtual beam emitter to obtain the target coordinate of the virtual beam emitter. The target coordinate indicates the target position.

For example, the terminal acquires the holding picture of the virtual prop launcher by formula (1), acquires the position of the hand of the target virtual object based on the holding picture of the virtual prop launcher by formula (2), and acquires the pointing direction of the hand of the target virtual object based on the holding picture of the virtual prop launcher by formula (3). The position and the pointing direction of the hand of the target virtual object are expressed by formula (4).

$$\text{GripAnim} = \text{GetGripAnim}(\text{CurrentWeapon}) \quad (1)$$

$$\text{HandLoc} = \text{GripAnim} \cdot \text{GetBoneLoc}(\text{"Hand"}) \quad (2)$$

$$\text{HandRot} = \text{GripAnim} \cdot \text{GetBoneRot}(\text{"Hand"}) \quad (3)$$

$$(\text{"Hand"}, \text{Loc}=(X=28.7, Y=15.6, Z=133.0), \text{Rot}= (\text{Roll}=0, \text{Yaw}=2, \text{Pitch}=0)) \quad (4)$$

where GripAnim is the holding picture of the virtual prop launcher, CurrentWeapon is the virtual prop launcher, Hand is the hand of the target virtual object, Loc=( ) is the coordinate of the hand, Rot is the pointing direction of the hand, and Roll is a rolling angle, indicating an angle of rotation around a Z axis. Yaw is a yawing angle, indicating an angle of rotation around a Y axis, and Pitch is a pitch angle, indicating an angle of rotation around an X axis.

The terminal acquires the target coordinate of the virtual beam emitter by formula (5).

$$\text{LaserLoc} = \text{HandLoc} + \text{HandRot}_{InverseTransformVector}(\text{LaserLoc\_WeaponSpace}) \quad (5)$$

where LaserLoc is the target coordinate of the virtual beam emitter, HandLoc is the position of the hand in the virtual scene, $\text{HandRot}_{InverseTransformVector}$ is the first rotation matrix, LaserLoc_WeaponSpace is the target mounting coordinate, WeaponSpace indicates the space where the virtual prop launcher is located, and a result of $\text{HandRot}_{InverseTransformVector}(\text{LaserLoc\_WeaponSpace})$ is the reference coordinate of the virtual beam emitter.

An application way of the above formula (5) is described below with an example, referring to the following calculation process:

LaserLoc (68.4, 12.3, 143.6)=(28.7, 15.6, 133.0)+ (Roll=0, Yaw=2, Pitch=0)$_{InverseTransrormVector}$(39.6, −3.3, 10.6), where (68.4, 12.3, 143.6) is a three-dimensional coordinate of the target mounting position in a root bone coordinate system, in a unit of centimeter; InverseTransformVecto plays a role in rotating the vector (39.6, −3.3, 10.6) by −2 degrees around a Yaw direction, and (39.6, −3.3, 10.6) is a relative coordinate between the target mounting position and the virtual prop launcher.

Part II: The terminal determines the emission direction of the beam based on the first positioning information, the second positioning information of the target virtual object, the type of the virtual prop launcher, the position of the hand, and the target position.

In a possible implementation, the terminal determines a target launching distance of the virtual prop launcher based on the type of the virtual prop launcher. The terminal determines a reference aim position of the virtual prop launcher based on the second positioning information of the target virtual object and the target launching distance. The terminal determines an emission direction vector of the beam based on the target position, the reference aim position of the virtual prop launcher, and the first positioning information.

In order to describe the above implementation more clearly, the concept of the target launching distance is described below.

Figure 9:
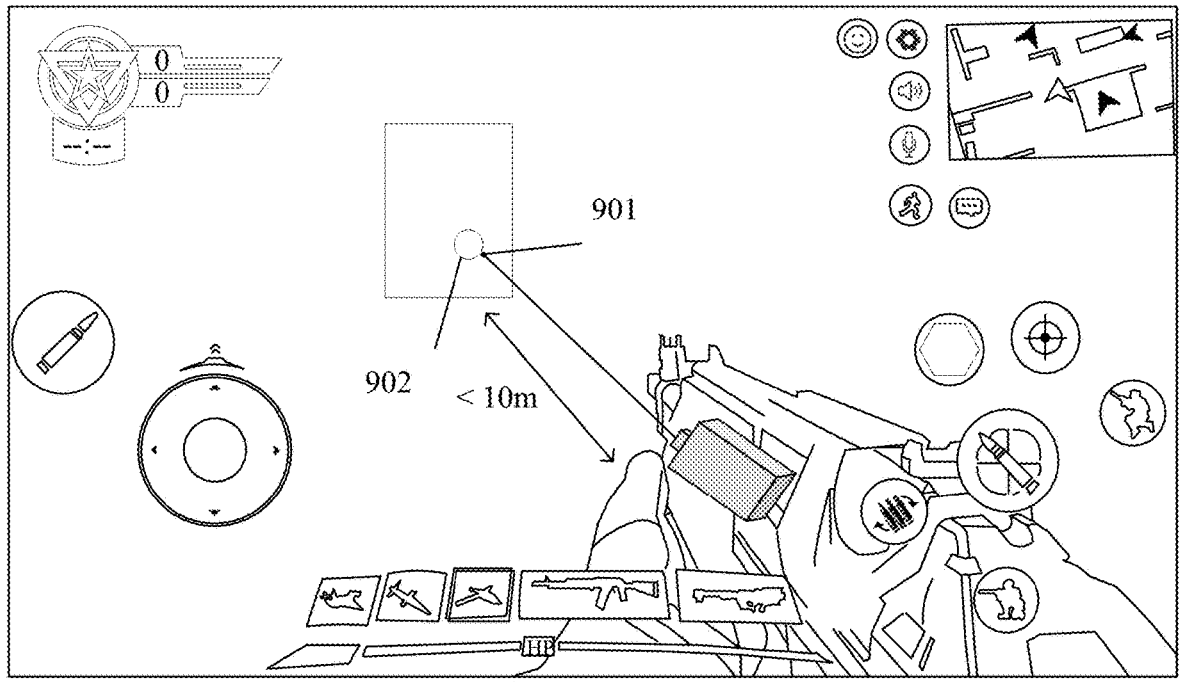
FIG. 9 is a schematic diagram showing another virtual scene according to an embodiment of this application.
Figure 10:
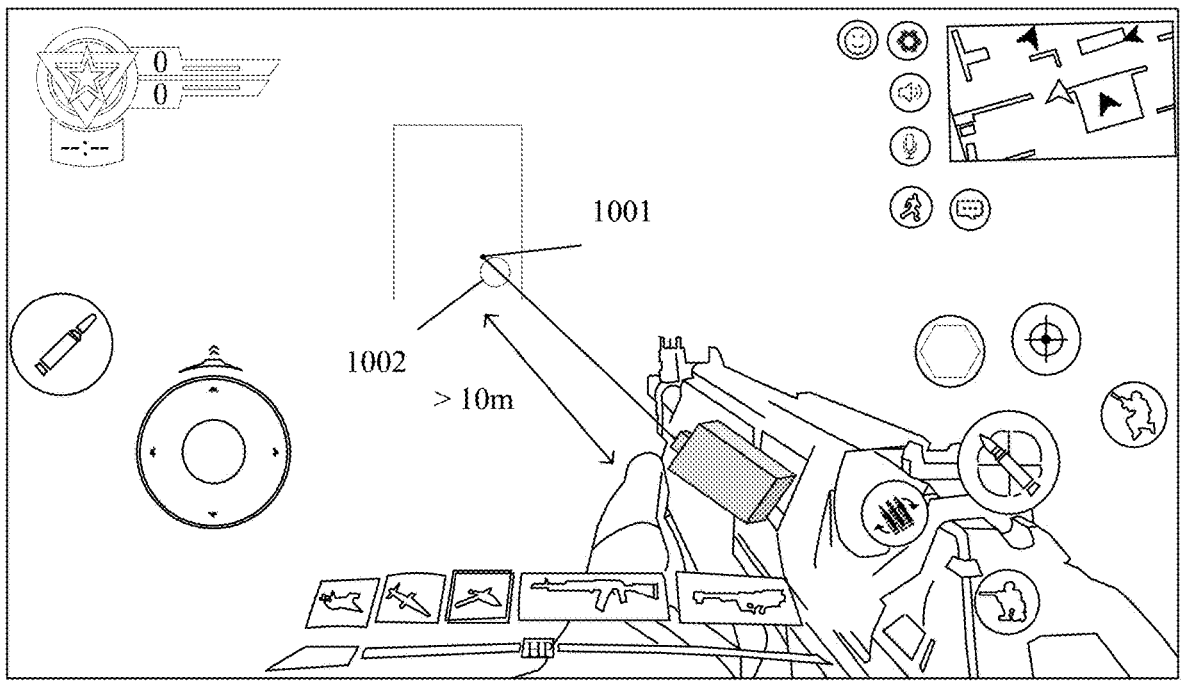
FIG. 10 is a schematic diagram showing another virtual scene according to an embodiment of this application.
Figure 11:
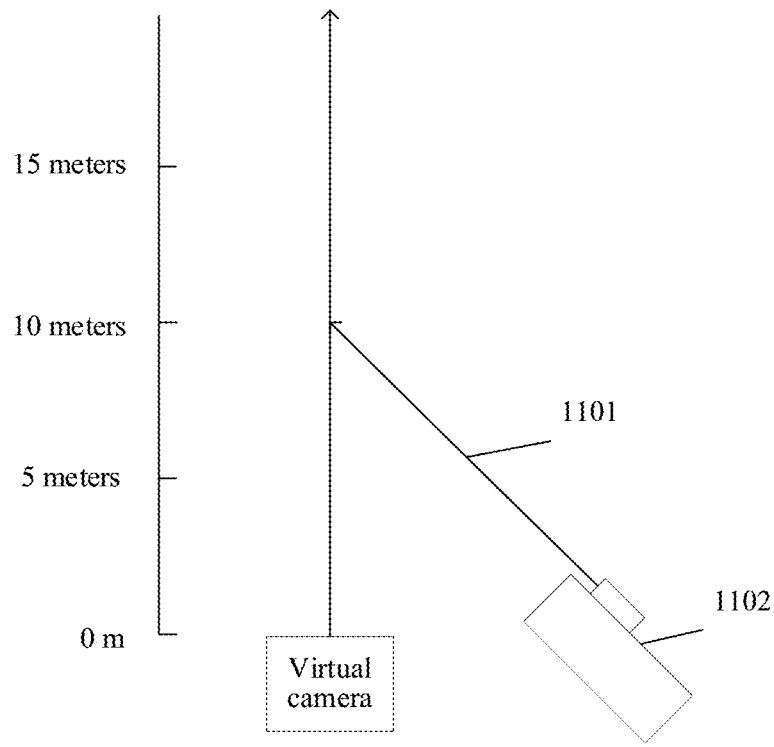
FIG. 11 is a schematic diagram showing a target launching distance according to an embodiment of this application.

In some embodiments, the target launching distance is also referred to as a zeroing distance, which refers to a distance that a light spot is just overlapped with a crosshair. The light spot refers to a point that is displayed in a case that the beam contacts a virtual obstacle in the virtual scene. In a case that the zeroing distance is 10 m, referring to FIG. 8, in a case that the distance from crosshair to the virtual camera is 10 m, the light spot 801 may be just overlapped with the crosshair 802. Referring to FIG. 9, in a case that the distance from the crosshair to the virtual camera is less than the zeroing distance, the light spot 901 may be located below the right of the crosshair 902; referring to FIG. 10, in a case that the distance from the crosshair to the virtual camera is greater than the zeroing distance, the light spot 1001 may be located above the left of the crosshair 1002; referring to FIG. 11, an angle formed by the beam 1101 and the virtual beam emitter 1102 is fixed and may not change due to different distances from the crosshair to the camera; and otherwise, the beam emitted by the virtual beam emitter is not real enough. In some embodiments, the zeroing distance is always an optimal fighting distance of the virtual prop launcher, and the zeroing distance is related to the type of the virtual prop launcher. For example, the zeroing distance of an MP5 virtual submachine gun is 30 m, the zeroing distance of an AKM virtual assault rifle is 80 m, and both the MP5 virtual submachine gun and the AKM virtual assault rifle are game props in the game. It is to be noted that, by adopting the technical scheme provided in the embodiments of this application, in a case shown in FIG. 9 and FIG. 10, the beam emitted by the virtual beam emitter may be overlapped with the crosshair, so as to assist the virtual prop launcher in aiming. In some embodiments, the crosshair is a point in the middle of a screen. During the firing of the hip fire, the virtual prop may drop nearby the crosshair, and the direction of the crosshair is a point on a straight line extending forward from the middle point of the virtual camera.

In this implementation, since different types of virtual prop launchers have different target launching distances, different types of virtual prop launchers have different optimal fighting distances. For different types of virtual prop launchers, the emission direction of the beam determined by the above implementation can point to the crosshair of the virtual prop launcher, i.e., point to the aim position of the virtual prop launcher, so that the aiming accuracy of the virtual prop launcher can be improved. In addition, since the virtual beam emitter has a plurality of mounting positions on the virtual prop launcher, in a process of determining the emission direction of the beam, the mounting position of the virtual beam emitter is also considered. Therefore, no matter on which position the virtual beam emitter is mounted on the virtual prop launcher, the determined emission direction of the beam can point to the crosshair of the virtual prop launcher.

After introducing the target launching distance, the above implementation is described below.

For example, the terminal performs query based on the type of the virtual prop launcher to obtain the target launching distance of the virtual prop launcher. The terminal acquires the second positioning information of the target virtual object in the virtual scene based on the holding picture of the target virtual object for the virtual prop launcher. The second positioning information includes a position and an orientation of the virtual camera in the virtual scene. The terminal generates a second rotation matrix based on the orientation of the virtual camera in the virtual scene. The terminal adopts the second rotation matrix and the position of the virtual camera in the virtual scene to process the target launching distance to obtain a reference aim position of the virtual prop launcher. The reference aim position is also the position where the beam points to in the virtual scene. The terminal determines a reference emission direction vector of the beam based on the target position and the reference aim position of the virtual prop launcher. The reference emission direction vector is a vector in a space established based on the target virtual object. The terminal rotates the reference emission direction based on the pointing direction of the hand to obtain the emission direction vector of the beam. The emission direction vector is a vector in a space established based on the virtual prop launcher.

For example, the terminal performs query in a target launching distance list based on the type of the virtual prop launcher to obtain the target launching distance of the virtual prop launcher. The target launching distance list stores a correspondence between the type of the virtual prop launcher and the target launching distance. The terminal acquires the coordinate of the virtual camera in the virtual scene by formula (6) based on the holding picture of the target virtual object for the virtual prop launcher, and acquires the orientation of the virtual camera in the virtual scene by formula (7). The terminal generates the second rotation matrix based on the orientation of the virtual camera in the virtual scene. The terminal adopts the second rotation matrix and the position of the virtual camera in the virtual scene to process the target launching distance by formula (8) to obtain a reference aim position of the virtual prop launcher. The terminal determines a reference emission direction vector of the beam based on the target position and the reference aim position of the virtual prop launcher by formula (9). The reference emission direction vector is a vector in a space established based on the target virtual object. The terminal rotates the reference emission direction vector based on the pointing direction of the hand by formula (10) to obtain the emission direction vector of the beam. The emission direction vector is a vector in a space established based on the virtual prop launcher.

$$CameraLoc = GripAnim \cdot GetBoneLoc(\text{``Camera''}) \quad (6)$$

$$CameraRot = GripAnim \cdot GetBoneRot(\text{``Camera''}) \quad (7)$$

$$ZeroingPoint = CameraLoc + CameraRot_{GetForwardVector} * ZeroingDistance \quad (8)$$

$$BeamDirection = (ZeroingPoint - LaserLoc) \cdot GetNormal \quad (9)$$

$$BeamDirection\_WeaponSpace = HandRot_{TransformVector}(BeamDirection) \quad (10)$$

where CameraLoc is the position of the virtual camera in the virtual scene, CameraRot is the orientation of the virtual camera in the virtual scene, ZeroingPoint is the reference aim position, ZeroingDistance is the target launching distance, CameraRot$_{GetForwardVector}$ is the second rotation matrix, BeamDirection is the reference emission direction vector, LaserLoc is the target position of the virtual beam emitter, GetNormal is used for acquiring a unit vector of the vector, BeamDirection_WeaponSpace is the emission direction vector of the beam, and HandRot$_{TransformVector}$ is a third rotation matrix generated based on the pointing direction of the hand. In some embodiments, the first rotation matrix and the third rotation matrix are reciprocal inverse matrices.

Step 503 is introduced below in combination with FIG. 12 and various optional implementations.

Figure 12:
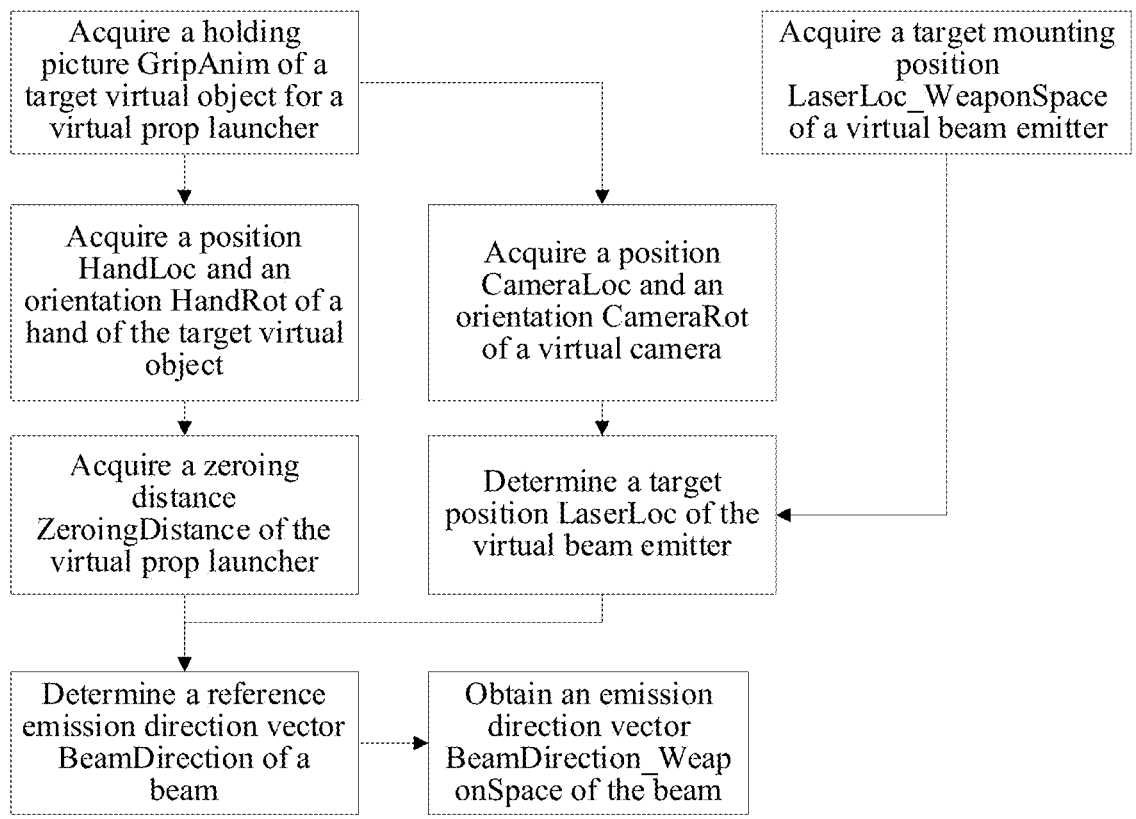
FIG. 12 is a flowchart of a virtual scene-based beam display method according to an embodiment of this application.

Referring to FIG. 12, the terminal acquires the holding picture GripAnim of the target virtual object for the virtual prop launcher. The terminal acquires the position HandLoc and orientation HandRot of the hand of the target virtual object based on the holding picture GripAnim. The terminal acquires the position CameraLoc and orientation CameraRot of the virtual camera based on the holding picture GripAnim. The terminal acquires the zeroing distance ZeroingDistance of the virtual prop launcher based on the type of the virtual prop launcher, i.e., acquires the target launching distance of the virtual prop launcher. The terminal acquires the target mounting position LaserLoc_WeaponSpace of the virtual beam emitter, and determines the target position LaserLoc of the virtual beam emitter based on the target mounting position. The terminal determines the reference emission direction vector BeamDirection of the beam based on the target position and the reference aim position of the virtual prop launcher. The terminal rotates the reference emission direction vector BeamDirection based on the pointing direction of the hand to obtain the emission direction vector BeamDirection_WeaponSpace of the beam.

It is to be noted that, the above step 501 to step 503 are explained by taking the real-time execution with the terminal as an example. In other possible implementations, the terminal can also perform the step 501 to step 503 prior to starting the game, and store a processing result for direct invoking during the running of the game. The embodiments of this application do not limit the performing time.

504: The terminal controls the virtual beam emitter to emit the beam in the emission direction.

In a possible implementation, the terminal performs rendering in the virtual scene based on the position of the virtual beam emitter and the emission direction, and displays the beam.

After step 504, optionally the terminal can also perform any of the following steps.

In a possible implementation, in a case that the aim position of the virtual prop launcher is the virtual obstacle in the virtual scene, the terminal displays the light spot on the virtual obstacle. The light spot is a crosspoint of the beam emitted by the virtual beam emitter and the virtual obstacle.

The virtual obstacles include virtual walls, virtual stone, virtual trees, and the like. In some embodiments, in a case that the aim position of the virtual prop launcher is any virtual object in the virtual scene, the terminal displays the light spot on the virtual object.

In this implementation, the terminal can indicate the aim position of the virtual prop launcher in a way of displaying the light spot, which plays a role in assisting the user to control the virtual prop launcher to aim.

Figure 8:
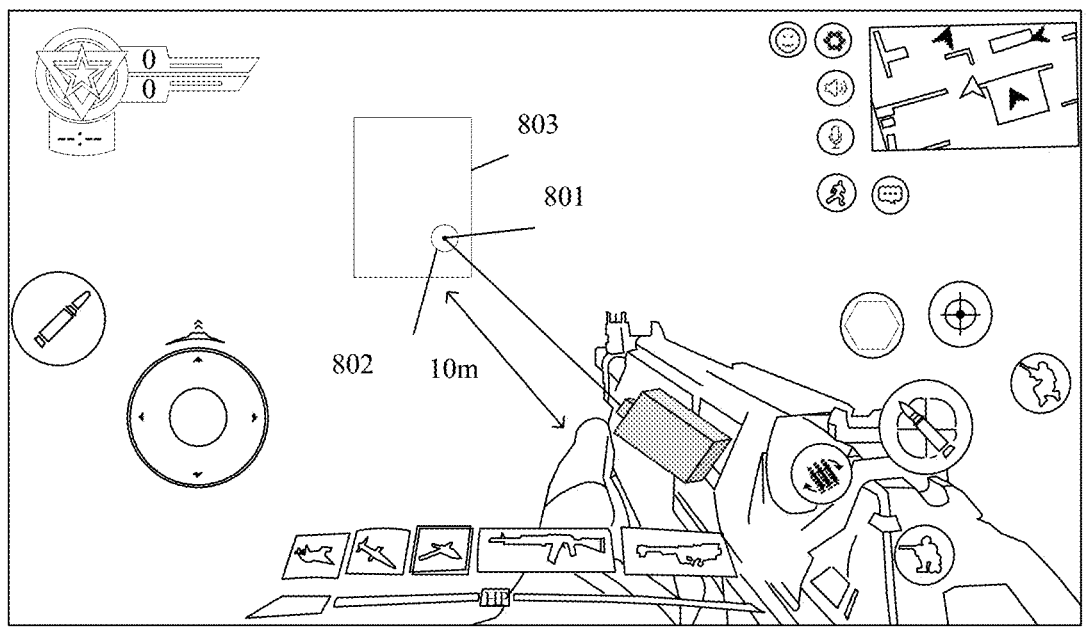
FIG. 8 is a schematic diagram showing another virtual scene according to an embodiment of this application.

For example, referring to FIG. 8, in a case that the aim position of the virtual prop launcher is the virtual obstacle 803 in the virtual scene, the terminal displays the light spot 801 on the virtual obstacle 803.

In a possible implementation, the target virtual object holds the virtual prop launcher in a first posture, and in a case that the target virtual object adjusts the posture of holding the virtual prop launcher from a first posture to a second posture, the terminal does not display the beam emitted by the virtual beam emitter.

The first posture is "hip fire", and the second posture is "aiming down sight (ADS)".

In this implementation, in a case that the posture of the target virtual object changes, the terminal may not display the beam, so that the user can pay attention to the aiming in a way of ADS, and the hit rate of the shooting of the virtual prop is increased.

An optional embodiment of this application may be formed by using any combination of all the foregoing optional technical schemes, and details are not described herein.

According to the technical scheme provided in the embodiments of this application, a function of mounting the virtual beam emitter in the virtual scene is provided, and the mounting position can be selected voluntarily during the mounting. During the aiming, the beam is displayed according to the target virtual object, the virtual prop launcher, and the mounting position of the virtual beam emitter, so that the beam can point to the aim position of the virtual prop launcher, the aiming of the user can be assisted by the beam, thereby reducing the aiming difficulty, and improving the efficiency of the human-computer interaction.

In related technologies, the beam may point to a point in front of the virtual prop launcher, which is not related to the posture of the hip fire. In order to optimize an artistic effect, by tilting up a holding angle of the hand a little during the hip fire, the light spot corresponding to the beam may shift up; and in a case that the holding angle of the hand is inclined leftwards a little, the light spot may shift leftwards. Therefore, the position of the light spot is far away from the crosshair, and the user cannot use the virtual beam emitter to aim. By adopting the technical scheme provided in the embodiments of this application, the angle of the beam can be adjusted according to the actual situation, so that the beam may be overlapped with the crosshair at the zeroing distance. Even in a case that the distance from the crosshair to the virtual camera is the zeroing distance, the crosshair may also be located on an extension line of the beam. Even in a case that the distance from the crosshair to the camera is greater than the zeroing distance, the crosshair may also be located on the edge of the beam. In sum, it may be convenient for the user to aim in various circumstances. Of course, in a case that there are a plurality of candidate mounting positions on the virtual prop launcher for mounting the virtual beam emitter, by adopting the technical scheme provided in the embodiments of this application, the beam can also always point to the position of the crosshair, that is, no matter on which mounting position the virtual beam emitter is mounted on the virtual prop launcher, an accurate aiming effect can be achieved by adopting the virtual beam emitter. At the same time, the plurality of candidate mounting positions also improve the flexibility of the virtual beam emitter, and enrich the choices of the user. In addition, in some shooting games without the crosshair, the auxiliary aiming during the application of the virtual prop launcher can also be achieved by directly using the technical scheme provided in the embodiments of this application.

Figure 13:
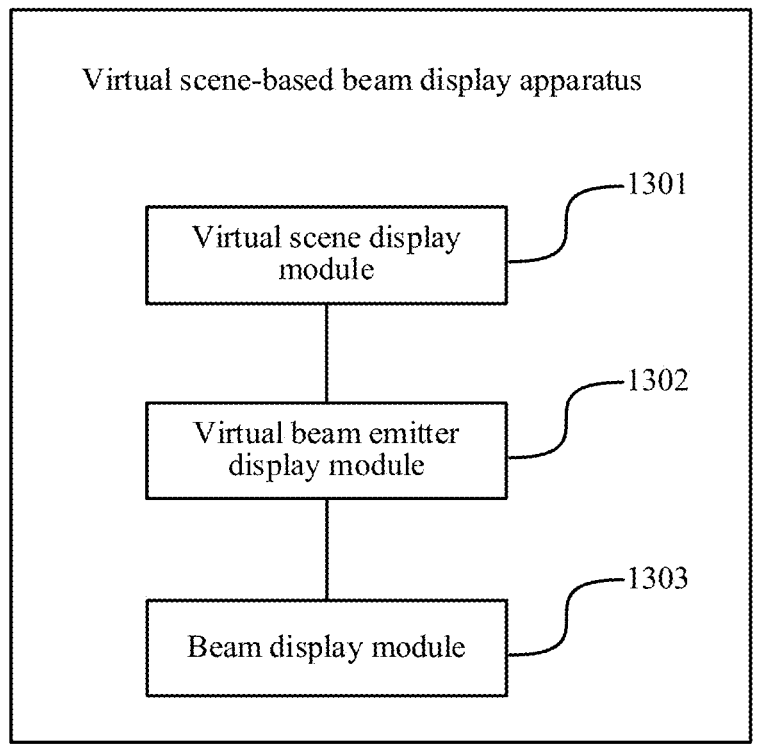
FIG. 13 is a schematic structural diagram of a virtual scene-based beam display apparatus according to an embodiment of this application.

FIG. 13 is a schematic structural diagram of a virtual scene-based beam display apparatus according to an embodiment of this application. Referring to FIG. 13, the apparatus includes: a virtual scene display module 1301, a virtual beam emitter display module 1302, and a beam display module 1303.

The virtual scene display module 1301 is configured to display a virtual scene, and a target virtual object and a virtual prop launcher held by the target virtual object are displayed in the virtual scene.

The virtual beam emitter display module 1302 is configured to display a mounted virtual beam emitter based on a target mounting position determined by a mounting operation in response to the mounting operation for the virtual prop launcher in the virtual scene, and the virtual beam emitter is configured to assist the virtual prop launcher in aiming.

The beam display module 1303 is configured to display a beam emitted by the virtual beam emitter in the virtual scene based on the target virtual object, the virtual prop launcher, and the target mounting position, and the beam points to an aim position of the virtual prop launcher.

In a possible implementation, the virtual beam emitter display module 1302 is configured to display a mounting page of the virtual prop launcher in the virtual scene in response to a first operation in the virtual scene, and a plurality of candidate mounting positions of the virtual prop launcher are displayed in the mounting page; determine a selected candidate mounting position in the plurality of candidate mounting positions as the target mounting position in response to a second operation in the mounting page; and display the virtual beam emitter on the target mounting position of the virtual prop launcher.

In a possible implementation, the virtual beam emitter display module 1302 is configured to perform any of the following:
 display the mounting page of the virtual prop launcher in the virtual scene in response to a picking operation on the virtual beam emitter in the virtual scene; and
 display the mounting page of the virtual prop launcher in the virtual scene in response to a click operation on a mounting control displayed in the virtual scene.

In a possible implementation, the virtual beam emitter display module 1302 is configured to perform any of the following:
 determine the candidate mounting position as the target mounting position in response to the click operation on any candidate mounting position in the plurality of candidate mounting positions in the mounting page; and
 determine the candidate mounting position as the target mounting position in response to that the virtual beam emitter in the mounting page is dragged to any candidate mounting position in the plurality of candidate mounting positions.

In a possible implementation, the beam display module 1303 is configured to determine an emission direction of the beam based on positioning information of the target virtual object in the virtual scene, the type of the virtual prop launcher, and the target mounting position, and the emission direction of the beam is relative to a launching direction of the virtual prop launcher; and control the virtual beam emitter to emit the beam in the emission direction.

In a possible implementation, the beam display module 1303 is configured to determine a target position of the virtual beam emitter based on the first positioning information of the target virtual object in the virtual scene and the target mounting position, the first positioning information including a position and a pointing direction of a hand of the target virtual object in the virtual scene; and determine the emission direction of the beam based on the first positioning information, second positioning information of the target virtual object, the type of the virtual prop launcher, the position of the hand, and the target position, the second positioning information including a position and an orientation of a virtual camera of the target virtual object in the virtual scene.

In a possible implementation, the beam display module 1303 is configured to generate a first rotation matrix based on the pointing direction of the hand; adopt the first rotation matrix to process the target mounting position to obtain a reference position of the virtual beam emitter; and fuse the position of the hand and the reference position of the virtual beam emitter to obtain a target position of the virtual beam emitter, the target position being a relative position between the virtual beam emitter and the target virtual object.

In a possible implementation, the beam display module 1303 is configured to determine a target launching distance of the virtual prop launcher based on the type of the virtual prop launcher; determine a reference aim position of the virtual prop launcher based on the second positioning information of the target virtual object and the target launching distance; and determine an emission direction vector of the beam based on the target position, the reference aim position of the virtual prop launcher, and the first positioning information.

In a possible implementation, the beam display module 1303 is configured to determine a reference emission direction vector of the beam based on the target position and the reference aim position of the virtual prop launcher, the reference emission direction vector being a vector in a space established based on the target virtual object; and rotate the reference emission direction based on the pointing direction of the hand to obtain the emission direction vector of the beam, the emission direction vector being a vector in a space established based on the virtual prop launcher.

In a possible implementation, the apparatus further includes:
 a light spot display module, configured to display a light spot on a virtual obstacle in a case that the aim position of the virtual prop launcher is the virtual obstacle in the virtual scene, the light spot being a crosspoint of the beam transmitted by the virtual beam emitter and the virtual obstacle.

In a possible implementation, the beam display module 1303 is further configured to not display the beam emitted by the virtual beam emitter in a case that the target virtual object adjusts the posture of holding the virtual prop launcher from a first posture to a second posture.

It is to be noted that, in a case that the virtual scene-based beam display apparatus in the foregoing embodiments displays the beam, the above functional modules are only described for exemplary purposes. In actual applications, the functions may be allocated to different functional modules according to specific needs, which means that the internal structure of a computer device is divided into different functional modules to complete all or some of the above described functions. In addition, the virtual scene-based beam display apparatus provided in the foregoing embodiments and the virtual scene-based beam display method embodiments fall within the same conception. For details of a specific implementation process, refer to the method embodiments. Details are not described herein again.

According to the technical scheme provided in the embodiments of this application, a function of mounting the virtual beam emitter in the virtual scene is provided, and the mounting position can be selected voluntarily during the mounting. During the aiming, the beam is displayed according to the target virtual object, the virtual prop launcher, and the mounting position of the virtual beam emitter, so that the beam can point to the aim position of the virtual prop launcher, the aiming of the user can be assisted by the beam, thereby reducing the aiming difficulty, and improving the efficiency of the human-computer interaction. The user can aim at the target effectively without repeated debugging, so that the battle time and game time are shortened, the power resources of the terminal may be saved, and the endurance of the terminal is improved.

Figure 14:
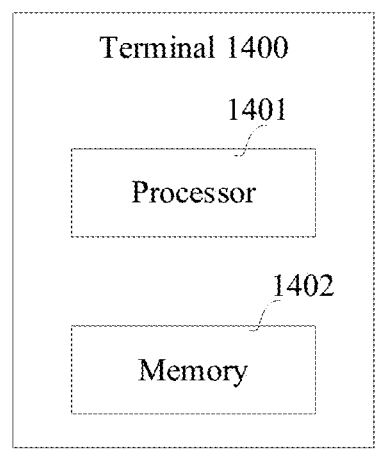
FIG. 14 is a schematic structural diagram of a computer device according to an embodiment of this application.

An embodiment of this application provides a computer device for performing the foregoing method. The computer device may be a terminal, and the structure of the terminal is introduced below:

FIG. 14 is a schematic structural diagram of a terminal according to an embodiment of this application. The terminal 1400 may be: a smart phone, a tablet computer, a notebook computer, or a desktop computer. The terminal 1400 may also be referred to as another name such as user equipment, a portable terminal, a laptop terminal, or a desktop terminal.

The terminal 1400 generally includes: one or more processors 1401 and one or more memories 1402.

The processor 1401 may include one or more processing cores, such as a 4-core processor, an 8-core processor, and the like. The processor 1401 may be implemented in at least one hardware form of a digital signal processor (DSP), a field-programmable gate array (FPGA), and a programmable logic array (PLA). The processor 1401 may also include a main processor and a co-processor. The main processor is a processor configured to process data in an awake state, and is also referred to as a central processing unit (CPU). The co-processor is a low power consumption processor configured to process the data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be non-transient. The memory 1402 may also include a high-speed random access memory and a nonvolatile memory, such as one or more disk storage devices or flash storage devices. In some embodiments, the non-transitory computer-readable storage medium in the memory 1402 is configured to store at least one computer-readable instruction, and the at least one computer-readable instruction is executed by the processor 1401 to implement the virtual scene-based beam display method provided in the method embodiments of this application.

A person skilled in the art may understand that the structure shown in FIG. 14 constitutes no limitation to the terminal 1400, and the terminal may include more or fewer components than those shown in the figure, or some components may be combined, or a different component deployment may be used.

In an exemplary embodiment, a computer-readable storage medium is further provided, such as a memory including a computer-readable instruction, and the computer-readable instruction may be executed by a processor to implement the virtual scene-based beam display method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

In an exemplary embodiment, a computer program product or a computer program is further provided, the computer program product or the computer program including a computer-readable instruction, the computer-readable instruction being stored in a computer-readable storage medium, a processor of a computer device reading the computer-readable instruction from the computer-readable storage medium, the processor executing the computer-readable instruction to make the computer device to perform the virtual scene-based beam display method.

In some embodiments, the computer-readable instruction according to the embodiment of this application may be executed by one computer device, or executed by a plurality of computer devices located in a same place, or executed by a plurality of computer devices distributed in a plurality of places and interconnected through a communication network, the plurality of computer devices distributed in a plurality of places and interconnected through the communication network constituting a block-chain system.

A person of ordinary skill in the art may understand that all or some of the steps of the foregoing embodiments may be implemented using hardware, or may be implemented by a program instructing relevant hardware. The program may be stored in a computer readable storage medium. The above-mentioned storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A virtual scene-based beam display method, performed by a computer device, comprising:
   displaying a virtual scene, a target virtual object and a virtual prop launcher held by the target virtual object being displayed in the virtual scene;
   in response to a mounting operation for the virtual prop launcher in the virtual scene, displaying a mounted virtual beam emitter based on a target mounting position determined by the mounting operation, the virtual beam emitter being configured to assist the virtual prop launcher in aiming; and
   displaying a beam emitted by the virtual beam emitter in the virtual scene based on the target virtual object, the virtual prop launcher, and the target mounting position, the beam pointing to an aim position of the virtual prop launcher, comprising:
      determining a target position of the virtual beam emitter based on first positioning information of the target virtual object in the virtual scene and the target mounting position, the first positioning information including a position and a pointing direction of a hand of the target virtual object in the virtual scene;
      determining an emission direction of the beam based on the first positioning information, second positioning information of the target virtual object, a target launching distance of the virtual prop launcher, and the target position, the second positioning information including a position and an orientation of a virtual camera of the target virtual object in the virtual scene; and controlling the virtual beam emitter to emit the beam in the emission direction.

2. The method according to claim 1, wherein displaying the mounted virtual beam emitter based on the target mounting position determined by the mounting operation in response to the mounting operation for the virtual prop launcher in the virtual scene includes:
displaying a mounting page of the virtual prop launcher in the virtual scene in response to a first operation in the virtual scene, a plurality of candidate mounting positions of the virtual prop launcher being displayed in the mounting page;
determining a selected candidate mounting position from the plurality of candidate mounting positions as the target mounting position in response to a second operation in the mounting page; and
displaying the virtual beam emitter at the target mounting position of the virtual prop launcher.

3. The method according to claim 2, wherein displaying the mounting page of the virtual prop launcher in the virtual scene in response to the first operation in the virtual scene includes:
displaying the mounting page of the virtual prop launcher in the virtual scene in response to a picking operation on the virtual beam emitter in the virtual scene; or
displaying the mounting page of the virtual prop launcher in the virtual scene in response to a click operation on a mounting control displayed in the virtual scene.

4. The method according to claim 2, wherein determining the selected candidate mounting position from the plurality of candidate mounting positions as the target mounting position in response to the second operation in the mounting page includes:
in response to a click operation on a first candidate mounting position of the plurality of candidate mounting positions in the mounting page, determining the first candidate mounting position as the target mounting position; or
in response to the virtual beam emitter in the mounting page being dragged to a second candidate mounting position of the plurality of candidate mounting positions, determining the second candidate mounting position as the target mounting position.

5. The method according to claim 1, wherein determining the target position of the virtual beam emitter based on the first positioning information of the target virtual object in the virtual scene and the target mounting position includes:
generating a first rotation matrix based on the pointing direction of the hand;
processing the target mounting position using the first rotation matrix to obtain a reference position of the virtual beam emitter; and
fusing the position of the hand and the reference position of the virtual beam emitter to obtain the target position of the virtual beam emitter, the target position being a relative position between the virtual beam emitter and the target virtual object.

6. The method according to claim 1, wherein determining the emission direction of the beam based on the first positioning information, the second positioning information of the target virtual object, the target launching distance of the virtual prop launcher, and the target position includes:
determining the target launching distance of the virtual prop launcher based on a type of the virtual prop launcher;
determining a reference aim position of the virtual prop launcher based on the second positioning information of the target virtual object and the target launching distance; and
determining an emission direction vector of the beam based on the target position, the reference aim position of the virtual prop launcher, and the first positioning information.

7. The method according to claim 6, wherein determining the emission direction vector of the beam based on the target position, the reference aim position of the virtual prop launcher, and the first positioning information includes:
determining a reference emission direction vector of the beam based on the target position and the reference aim position of the virtual prop launcher, the reference emission direction vector being a vector in a space established based on the target virtual object; and
rotating the reference emission direction based on the pointing direction of the hand to obtain the emission direction vector of the beam, the emission direction vector being a vector in a space established based on the virtual prop launcher.

8. The method according to claim 1, further comprising:
in response to the aim position of the virtual prop launcher being at a virtual obstacle in the virtual scene, displaying a light spot on the virtual obstacle, the light spot being a crosspoint of the beam emitted by the virtual beam emitter and the virtual obstacle.

9. The method according to claim 1,
wherein the target virtual object holds the virtual prop launcher in a first posture;
the method further comprising:
not displaying the beam emitted by the virtual beam emitter in response to the target virtual object adjusting a posture of holding the virtual prop launcher from the first posture to a second posture.

10. A computer device comprising:
one or more processors; and
one or more memories storing at least one computer-readable instruction that, when executed by the one or more processors, causes the one or more processors to:
display a virtual scene, a target virtual object and a virtual prop launcher held by the target virtual object being displayed in the virtual scene;
in response to a mounting operation for the virtual prop launcher in the virtual scene, display a mounted virtual beam emitter based on a target mounting position determined by the mounting operation, the virtual beam emitter being configured to assist the virtual prop launcher in aiming; and
display a beam emitted by the virtual beam emitter in the virtual scene based on the target virtual object, the virtual prop launcher, and the target mounting position, the beam pointing to an aim position of the virtual prop launcher, comprising:
determining a target position of the virtual beam emitter based on first positioning information of the target virtual object in the virtual scene and the target mounting position, the first positioning information including a position and a pointing direction of a hand of the target virtual object in the virtual scene;
determining an emission direction of the beam based on the first positioning information, second positioning information of the target virtual object, a target launching distance of the virtual prop launcher, and the target position, the second positioning information including a position and an orientation of a virtual camera of the target virtual object in the virtual scene; and controlling the virtual beam emitter to emit the beam in the emission direction.

11. The computer device according to claim 10, wherein the at least one computer-readable instruction further causes the one or more processors to:

display a mounting page of the virtual prop launcher in the virtual scene in response to a first operation in the virtual scene, a plurality of candidate mounting positions of the virtual prop launcher being displayed in the mounting page;

determine a selected candidate mounting position from the plurality of candidate mounting positions as the target mounting position in response to a second operation in the mounting page; and display the virtual beam emitter at the target mounting position of the virtual prop launcher.

12. The computer device according to claim 11, wherein the at least one computer-readable instruction further causes the one or more processors to:

display the mounting page of the virtual prop launcher in the virtual scene in response to a picking operation on the virtual beam emitter in the virtual scene; or display the mounting page of the virtual prop launcher in the virtual scene in response to a click operation on a mounting control displayed in the virtual scene.

13. The computer device according to claim 11, wherein the at least one computer-readable instruction further causes the one or more processors to:

in response to a click operation on a first candidate mounting position of the plurality of candidate mounting positions in the mounting page, determine the first candidate mounting position as the target mounting position; or in response to the virtual beam emitter in the mounting page being dragged to a second candidate mounting position of the plurality of candidate mounting positions, determine the second candidate mounting position as the target mounting position.

14. The computer device according to claim 10, wherein the at least one computer-readable instruction further causes the one or more processors to:

generate a first rotation matrix based on the pointing direction of the hand;

process the target mounting position using the first rotation matrix to obtain a reference position of the virtual beam emitter; and fuse the position of the hand and the reference position of the virtual beam emitter to obtain the target position of the virtual beam emitter, the target position being a relative position between the virtual beam emitter and the target virtual object.

15. The computer device according to claim 10, wherein the at least one computer-readable instruction further causes the one or more processors to:

determine the target launching distance of the virtual prop launcher based on a type of the virtual prop launcher;

determine a reference aim position of the virtual prop launcher based on the second positioning information of the target virtual object and the target launching distance; and determine an emission direction vector of the beam based on the target position, the reference aim position of the virtual prop launcher, and the first positioning information.

16. A non-transitory computer-readable storage medium storing at least one computer-readable instruction that, when executed by one or more processors, causes the one or more processors to:

display a virtual scene, a target virtual object and a virtual prop launcher held by the target virtual object being displayed in the virtual scene;

in response to a mounting operation for the virtual prop launcher in the virtual scene, display a mounted virtual beam emitter based on a target mounting position determined by the mounting operation, the virtual beam emitter being configured to assist the virtual prop launcher in aiming; and display a beam emitted by the virtual beam emitter in the virtual scene based on the target virtual object, the virtual prop launcher, and the target mounting position, the beam pointing to an aim position of the virtual prop launcher, comprising:

determining a target position of the virtual beam emitter based on first positioning information of the target virtual object in the virtual scene and the target mounting position, the first positioning information including a position and a pointing direction of a hand of the target virtual object in the virtual scene;

determining an emission direction of the beam based on the first positioning information, second positioning information of the target virtual object, a target launching distance of the virtual prop launcher, and the target position, the second positioning information including a position and an orientation of a virtual camera of the target virtual object in the virtual scene; and controlling the virtual beam emitter to emit the beam in the emission direction.

* * * * *